Patented Dec. 4, 1923.

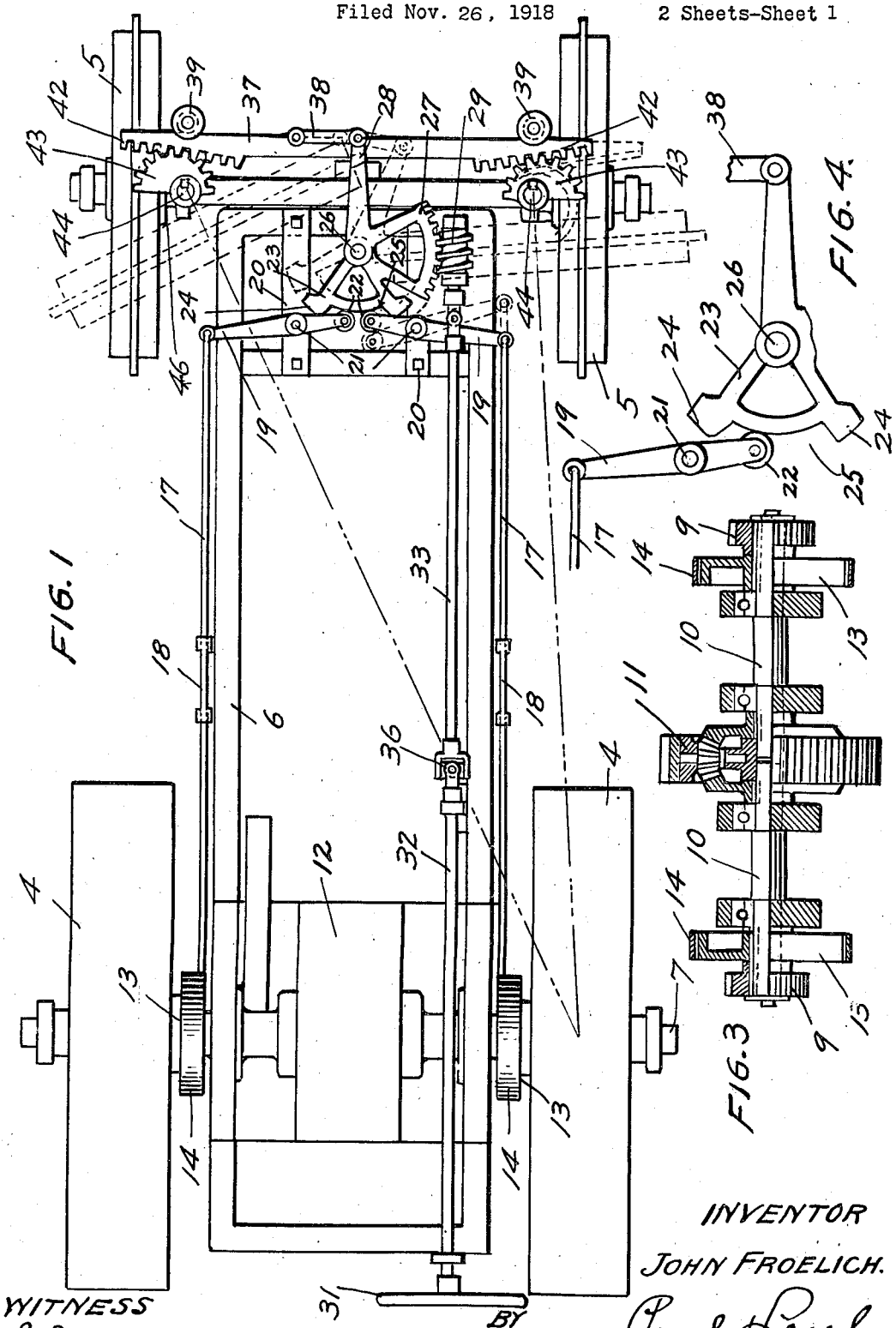

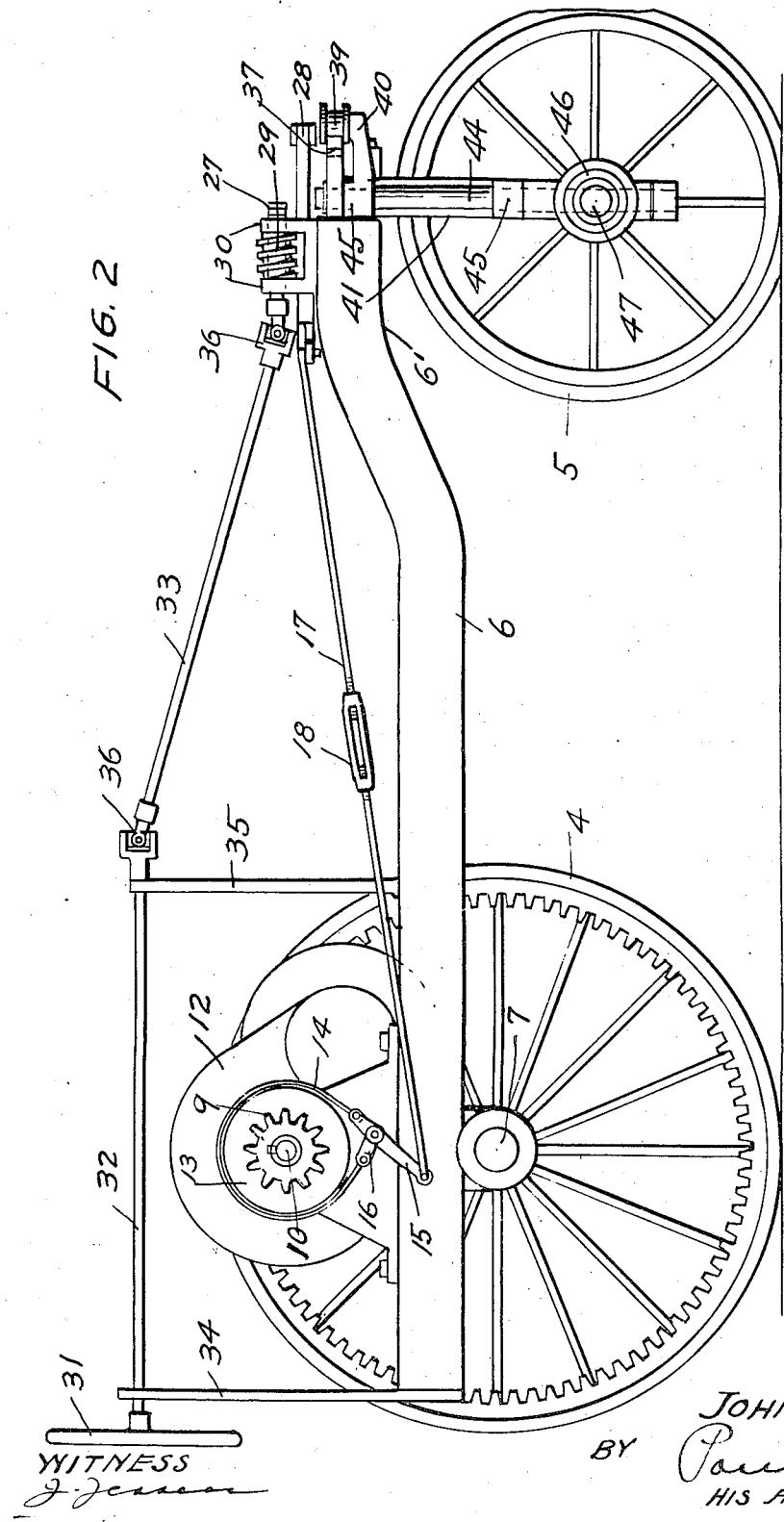

1,476,068

UNITED STATES PATENT OFFICE.

JOHN FROELICH, OF ST. PAUL, MINNESOTA, ASSIGNOR TO LESLIE S. HACKNEY, OF ST. PAUL, MINNESOTA.

VEHICLE STEERING GEAR.

Application filed November 26, 1918. Serial No. 264,155.

*To all whom it may concern:*

Be it known that I, JOHN FROELICH, a citizen of the United States, resident of St. Paul, county of Ramsey, in the State of Minnesota, have invented certain new and useful Improvements in Vehicle Steering Gears, of which the following is a specification.

My invention relates in general to mechanism for steering and controlling the movements of power driven tractors or other similar vehicles and more particularly to tractors having two driving members. The object of my invention is to provide a more easily and completely controlled steering gear for the tractor to enable the operator to make short radius turns with the tractor with only the use of a single steering element and with rapidity and ease.

My invention may be applied to any tractors or trucks designed for any kind of service, but is of special advantage in connection with farm tractors for row crop planting, cultivating, plowing, discing and all similar farm work where easy control and short turning radius of the tractor are needed.

My invention consists in certain constructions and combinations, hereinafter described and particularly pointed out in the claims, and will be more readily understood by reference to the accompanying drawings, of which, Figure 1 is a plan view of a tractor having my invention applied thereto, Figure 2 is a side elevation of Figure 1, with the near side wheels of the tractor removed, Figures 3 and 4 are detail views.

In the drawings, 4 represents the two drive wheels, 5 the steering wheels and 6 the main frame of the tractor. The frame 6 may be of any preferred construction, but is preferably provided with the upwardly extending or goose neck portion 6' for the clearance of the steering wheels 5. Connected to the frame 6 is the axle 7 upon which the drive wheels 4 are mounted. Power is transmitted to the steering wheels 5, preferably through the internal gears 8 connected to the wheels 4, and in mesh with the driving pinions 9. The pinions 9 are rigidly secured to differentially operated shafts 10. The differential gearing 11 (preferably enclosed in a casing 12 and not described in detail, as any type of gearing may be used) derives rotation from any source of power, preferably an internal combustion engine (not shown) and transmits rotation to the shafts 10. Brake drums 13 are rigidly secured to the shafts 10 and brake bands 14 encircle the drums 13 and are adapted to contract around the drums by the operation of brake levers 15 and links 16. Reach rods 17, provided with suitable adjusting turn buckles 18, connect the brake levers 15 with cam operated arms 19, pivoted to the frame pieces 20 at 21. The arms 19 carry rollers 22 arranged to engage a cam 23, pivoted to the frame 4 at 26 and having raised cam portions 24 and a central depression or cut away portion 25 in which the rollers 22 normally rest. The cam 23 is preferably integral with a segmental worm wheel 27 and arm 28. A worm 29 is mounted in bearings 30 on the frame 4 and meshes with the segmental worm wheel 27 and is operated from the hand wheel 31 through connecting shafts 32 and 33, supported in bearing brackets 34 and 35 and provided with universal joint couplings 36. The arm 28 of the segmental worm wheel 27 and cam 23 is connected to a sliding rack bar 37 by a link 38. The rack bar is supported in flanged rollers 39 arranged upon lugs 40 projecting from the axle 41. Angular racks 42, in mesh with eccentric gear segments 43, are provided on each end of the rack bar 37. The gear segments 43 are rigidly fastened to knuckle shafts 44 arranged to turn in bearings 45 upon the axle 41. The shafts 44 are secured to the steering knuckles 46 having the stub axles 47 upon which the steering wheels 5 are mounted.

The operation of the steering gear is as follows: When the rollers 22 of the arms 19 rest in the depression 25 of the cams 23, the brake bands 14 are released from the brake drums 13 and the differential action of the pinion shafts 10 has free play. Steering of the tractor is then accomplished in the ordinary way by means of a hand wheel 31, shafts 32 and 33 and connection to the steering knuckles 46 of the wheels 5. The depressed or cut away portion of the cam 23 is of sufficient length to prevent the rollers 22 from coming in contact with the raised cam portions 24 during normal driving and steering of the tractor. When, however, it is desired to turn the tractor at a more than ordinary sharp angle in a given direction, say at an angle of substantially 90°, the steering hand wheel 31 is rotated to turn the wheels 5 in that direction. At a certain angle of the wheels 5, limited for practical reasons, the cam portion 24 engages one of the rollers 22 and forces it outward, exerting pressure to contract the brake band 14 on the side corresponding to the direction in which the tractor is turning. This action retards the corresponding drive and accelerates the rotation of the opposite wheel, which reduces the radius in which the tractor is turning. If a moderately sharp turn is required, pressure may be applied to the arm 28 to partially set the brake and retard the rotation of the shaft 10 by means of a cam face 24, partially forcing the roller outward, but if a maximum short turn is to be made, the hand wheel is operated to rotate the cam a sufficient distance to force the raised portion 24 of the cam against a roller 22, setting the brake to prevent rotation of the shaft 10 and turning the steering wheels to the position shown in dotted lines in Figure 1. In this position and one of the drive wheels 4 being held stationary through the driving shaft 10 and gears 8 and 9, the tractor will turn with the center of the stationary drive wheel as the center of the radius, as indicated in Figure 1. The angularity of the racks 42 and the corresponding eccentricity of the gear segments 43 is of such a degree and form that the difference in the turning radius and location of the two steering wheels relative to the center of the turn is exactly compensated for.

While I have shown the steering gear in connection with a two front wheel steering rig, it is obvious that it might as readily be applied to rear wheel steering apparatus or a single steering wheel, and various other modifications may be made without departing from the spirit of the invention.

I claim as my invention:

1. In a vehicle, comprising a frame, traction wheels, and brakes for said wheels; a pair of steering wheels, upright spindles connected with said wheels, gear segments mounted eccentrically on said spindles, means connecting one gear segment with the other and having a shifting engagement with each gear segment, and means for operating the gears through their connecting means and applying the brake to one of the traction wheels.

2. In a vehicle, comprising a frame, traction wheels, and brakes for said wheels; a steering wheel, an upright spindle connected with the steering wheel, a segmental gear mounted eccentrically on said spindle, a member having a shifting connection with the gear for turning the steering wheel, and means operatively connecting said gear operating member with a brake of the traction wheels for simultaneously turning the steering wheel and applying the traction wheel brake.

3. In a vehicle, comprising a frame, traction wheels, and brakes for said wheels; a pair of steering wheels, upright spindles connected with said wheels, segmental gears eccentrically mounted on said spindles, a reciprocating rack bar having its teeth meshing with the segmental gears, and means for moving the rack bar to actuate the segmental gears to turn the steering wheels.

4. In a vehicle, comprising a frame, traction wheels, and brakes for said wheels; a pair of steering wheels, means connecting one of said wheels with the other for simultaneously turning both steering wheels, a cam operatively connected with said connecting means for actuating the same, said cam having oppositely disposed enlargements with an intervening space, pivoted levers having connections with the brakes of the traction wheels and having one end disposed in the path of movement of the enlargements of the cam and normally lying in the space between said enlargements, and means for operating said cam to transmit power to the means connecting the pair of steering wheels and simultaneously apply one of the traction wheel brakes through one of said levers.

In witness whereof, I have hereunto set my hand this 22d day of November 1918.

JOHN FROELICH.